United States Patent [19]

Shinoda et al.

[11] 4,351,650

[45] Sep. 28, 1982

[54] EXHAUST GAS DESULFURIZATION APPARATUS

[75] Inventors: Naoharu Shinoda; Nobutaka Maeda; Kyoji Kubo, all of Hiroshima, Japan

[73] Assignee: Mitsubishi Jukogyo Kabushiki Kaisha, Tokyo, Japan

[21] Appl. No.: 249,924

[22] Filed: Apr. 1, 1981

[51] Int. Cl.$^3$ ............................................. B01D 53/08
[52] U.S. Cl. ...................................... 55/181; 55/208; 55/390
[58] Field of Search .................. 55/34, 60, 77, 78, 181, 55/198, 208, 390

[56] References Cited

U.S. PATENT DOCUMENTS 3,504,483  4/1970  Tamura et al. .................. 55/180

FOREIGN PATENT DOCUMENTS

| 831093 | 2/1952 | Fed. Rep. of Germany | 55/390 |
| 883743 | 7/1953 | Fed. Rep. of Germany | 55/390 |
| 53-21076 | 2/1978 | Japan | 55/390 |
| 54-5872 | 1/1979 | Japan | 55/181 |
| 54-68580 | 6/1979 | Japan | 55/390 |
| 54-125180 | 9/1979 | Japan | 55/181 |

Primary Examiner—Robert H. Spitzer
Attorney, Agent, or Firm—Holman & Stern

[57] ABSTRACT

In an exhaust gas desulfurization apparatus having a cylindrical cage whose axis is substantially vertical and which is revolvable around the axis, and a packing section of an adsorbent material formed in the cage, the inside and outside of the cage being divided by casings and seal means along the periphery into at least four segmental zones respectively for adsorption, desorption, cooling, and adsorbent replacement, whereby the sulfur oxides are removed from the exhaust gas by adsorption by a gas-removing adsorbent and, with the revolution of the cage, the packing zone of the adsorbent is circulatingly shifted in position to the respective zones so that the gas-removing adsorbent is desorbed, cooled, and replaced, the improvement which comprises a packing or particulate separating section of a packing material, smaller in particle size than the gas-removing adsorbent, formed in the cage and outside of the gas-removing adsorbent packing section, so as to pass the exhaust gas through the packing section of the particulate separating packing and thence through the packing section of the gas-removing adsorbent, the gas-removing adsorbent and the particulate separating in the respective packing sections being replaceable independently of each other.

7 Claims, 4 Drawing Figures

EXHAUST GAS DESULFURIZATION APPARATUS

BACKGROUND OF THE INVENTION

1. Field of the Invention

This invention relates to a dry exhaust gas desulfurization apparatus of a novel construction for use in recovering and removing sulfur oxides from the combustion waste or exhaust gases from boilers, industrial furnaces and the like.

2. Description of the Prior Art

The spread of flue gas desulfurization facilities in Japan has been marked in the past decade. In the early stage of development, various techniques based on the dry process and others were proposed for flue gas desulfurization. Today, the wet process, so called because flue gas is brought into contact with liquid absorbent in an absorption tower, is predominant for plants, especially of large capacities, in commercial operation.

However, the wet process has a number of disadvantages. It requires an enormous volume of process water including the quantity allowed for evaporation. The treated gas is relatively low in temperature, in the range of 50°-70° C., and contains considerable moisture and, if released directly from the stack, the steam content will form volumes of white smoke. To make them less conspicuous, reheating the gaseous emissions prior to the release is sometimes necessary. In that case, extra fuel for reheating will be needed. If released at the relatively low temperature from the stack, the exhaust gas will not effectively diffuse into the atmosphere.

Among other disadvantages is the necessity of providing a facility for disposing of the waste water used for the cooling and dust removal before desulfurization of the dirty gas. Above all, the fuel needed for reheating the wet-processed gas accounts for as much as 2 to 3% of the principal fuel requirement of a large-capacity power plant boiler, posing a major problem from an energy-saving viewpoint.

On the other hand, the dry process has been proposed variously. Of the variations, one that uses activated carbon for adsorption is highly effective for desulfurization. Nevertheless, it has seldom been accepted commercially because of its drawbacks as follows. The method involves repetition of an adsorption-heating-desorption-cooling cycle in which the activated carbon that has adsorbed sulfur oxides is heated to 250°-700° C., caused to release the oxides by dint of an inert gas, and cooled down to the gas temperature for reuse. However, a practical apparatus for automatically repeating the cycle has not been developed yet. The adsorption capacity of activated carbon decreases with repeated use, and therefore the carbon must be renewed at regular intervals of time. The replenishment and replacement demand much labor. Also, the powdering of activated carbon after repeated cycles can lead to accidents, such as dust explosion or burning. In addition, the dust in the exhaust gas gradually deposits on the adsorption section of activated carbon until it chokes the section, lowers the adsorption performance, and raises the gas pressure loss in the adsorption section.

We previously proposed "an exhaust gas desulfurization apparatus for removing sulfur oxides from exhaust gas by adsorption to an adsorption section, which comprises a revolvable, upright cylindrical cage, a packing section of adsorbent formed along the outer periphery of the cage, the outside and inside of said cage being divided by casings and seal means into five zones respectively for adsorption, heating, desorption, cooling, and adsorbent replacement, and means located opposite to said adsorbent replacement zone for supplying and discharging the adsorbent." (Japanese Patent Application No. 150133/79) The present invention is an improvement over the above apparatus in respect of the dust control of exhaust gas.

The dust content of exhaust gas, for example, from a coal-firing boiler, is very large, amounting to 10–20 g/m$^3$N. If the gas was directly passed through an exhaust gas desulfurization apparatus, troubles, such as dust deposition and plugging, would result, making stable operation impossible. Moreover, the release of gases entraining much dust from stacks is not permitted in order to prevent secondary air pollution. For these reasons the current practice is to install an electric dust collector or the like before the desulfurization equipment and remove dust from the exhaust gas prior to its introduction into the equipment. The exhaust gases pretreated by the collector or the like, however, still show dust concentrations approximately in the range of 100–500 mg/m$^3$N.

The previously proposed exhaust gas desulfurization apparatus offers a number of advantages and yet, when handling a heavily dust-laden exhaust gas, there is the danger of the dust depositing and choking the adsorption section, rendering smooth operation impossible.

SUMMARY OF THE INVENTION

This invention has been perfected with a view to eliminating the foregoing disadvantages of the previously proposed apparatus. It is intended, under the invention, to preclude the troubles of dust deposition on and choking of the packing section of an adsorbent, by providing a packing section of a particulate separating packing smaller in particle size than the adsorbent gas-removing (the particulate separating packing section being hereinafter called a "dummy section") in the upstream stage of the adsorbent packing section and by controlling the proportion of the particulate separating packing to be replaced in the dummy section according to the dust concentration in the exhaust gas.

Thus, the invention provides an exhaust gas desulfurization apparatus having a cylindrical cage whose axis is substantially vertical and which is revolvable around the axis, and a packing section of an adsorbent material formed in the cage, the inside and outside of the cage being divided by casings and seal means along the periphery into at least four segmental zones respectively for adsorption, desorption, cooling, and adsorbent replacement, whereby the sulfur oxides are removed from the exhaust gas by adsorption by the gas-removing adsorbent and, with the revolution of the cage, the packing zone of the adsorbent is circulatingly shifted in position to the respective zones so that the adsorbent is desorbed, cooled, and replaced, characterized in that a packing section of a particulate separating packing material, smaller in size than the gas-removing adsorbent, is formed in the cage and outside of the gas-removing adsorbent packing section, so as to pass the exhaust gas through the packing section of the particulate separating packing and thence through the packing section of the gas-removing adsorbent, said adsorbent and packing in the respective packing sections being replaceable independently of each other.

The packing material of the dummy section that constitutes the improvement according to the invention may be an inert substance or the adsorbent itself provided the size is smaller than the adsorbent used for the adsorbent packing section.

BRIEF DESCRIPTION OF THE DRAWINGS

The invention will be described in more detail below with reference to the accompanying drawings, in which:

Referring to FIG. 1, there is shown a rotary cage 1 in the form of a vertical cylinder fixedly mounted on a disk-shaped turntable 2 of rugged construction. The turntable 2, in turn, rests on a plurality of rollers 3. A central pillar or shaft 4 carries a plurality of arms 5 radially extended from its lower part toward and secured to the inner periphery of the disklike turntable 2. Each arm 5 is centered in position by a side roller 6 attached to its inner end. By means of driving rollers 7 and drives 8, the turntable 2 and the rotary cage 1 are caused to revolve together at a low speed (e.g., one revolution per 5-10 hours) around the central pillar 4. The speed of revolution is controllable to suit the treating conditions for the gas to be handled. The rotary cage 1, for use as part of a large-scale commercial plant, may be as large as 10-20 meters in diameter and 10-25 meters in height. Therefore, it is, desirably, as light in weight as possible. To this end it may, for instance, consist of a framework of pipes, wire nets 27, 27' spread over the inner and outer surfaces and in between, and a cylindrical packing section formed by filling the inner half of the cylindrical space defined by the framework and netting with a gas-removing adsorbent material 26 and filling the outer half with a particulate separating packing material 26'.

Figure 1:
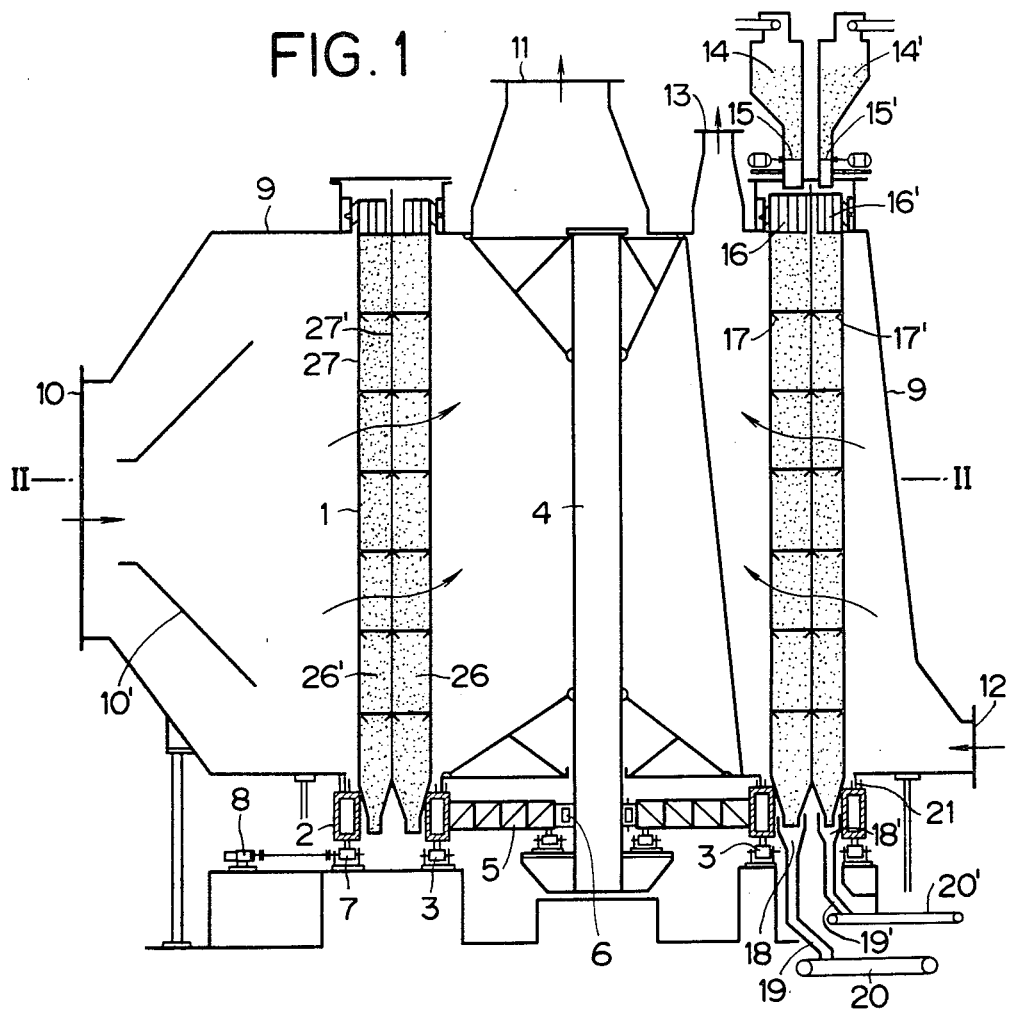
FIG. 1 is a side elevational view of an embodiment of the invention.

The apparatus further includes an outer casing or housing 9 formed with an inlet 10 for the gas to be treated, a baffle 10', a treated gas outlet 11, a desorption gas inlet 12 and an outlet 13, adsorbent and packing supply tanks 14, 14', electrically or pneumatically operated gate valves 15, 15', material seals 16, 16' for preventing upward leakage of the treated gas, plates 17, 17' held inside the rotary cage 1 to avoid bridging of the adsorbent and packing, adsorbent and packing discharge gates 18, 18', discharge hoppers 19, 19', discharge conveyors 20, 20', and a gas seal 21.

Figure 2:
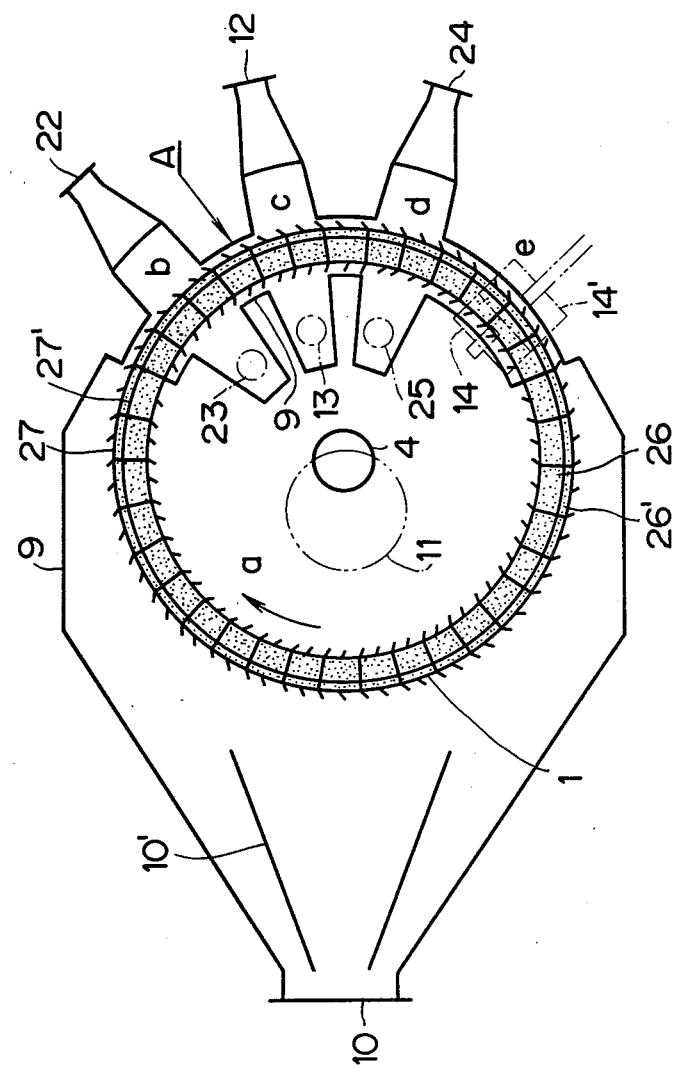
FIG. 2 is a sectional view taken on the line II—II of FIG. 1.

In FIG. 2, which is a transverse section through the line II—II of FIG. 1, the symbol b denotes a preheating zone which may be provided where necessary. The numeral 22 indicates a heating gas inlet, 23 a heating gas outlet, 24 a cooling gas inlet, and 25 a cooling gas outlet.

The gas-removing adsorbent and particulate separating packing feeders shown in FIG. 1 are indicated simply by a chain-line square (14, 14') in FIG. 2.

Figure 3:
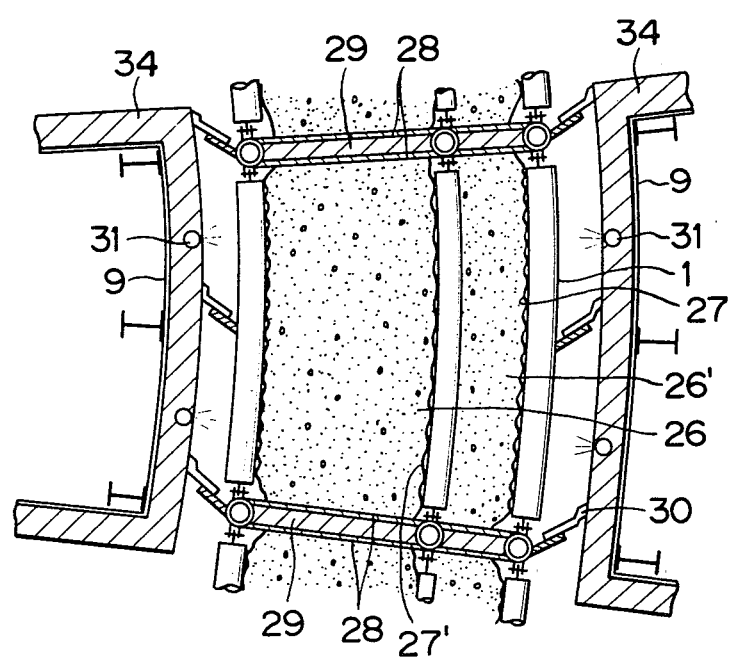
FIG. 3 is a fragmentary sectional view of the portion A in FIG. 2, enlarged to show the details.

FIG. 3 illustrates the portion A of FIG. 2 on an enlarged scale, showing the construction of the rotary cage 1 and the gas seal structure. As stated above, the rotary cage 1 is built of a framework of a perforated pipe assembly with wire nets 27, 27' and filled with a gas-removing adsorbent material 26 and a particulate separating packing material 26'.

Desirably, the particle size of the adsorbent is chosen from the range of 5-20 mm in consideration of the pressure loss, and the thickness of the adsorbent section to be formed is in the range of 500-1200 mm. The packing in the dummy or particulate separating section is desired to be finer in size than the adsorbent, and the suitable thickness of the packing section is 100-1000 mm.

The rotary cage 1 is divided into segments by partitions 28 in pairs, and the space between the partitions in each pair is packed with a heat-insulating material 29 to prevent heat transfer from segment to segment. Seal strips 30' of asbestos board attached to the rotary cage and seal strips 30 attached to the inner casing and the housing establish a gas seal between inner casing 9' and housing 9. For an added sealing effect, a sealing gas is injected through pipes 31 into the spaces between the cage and the inner casing 9 and outer portion of the cage and the housing 9. The casings 9 and 9' themselves are lined with an insulating material 34 to alleviate the thermal stresses to be caused by the hot heating and desorption gases.

Figure 4:
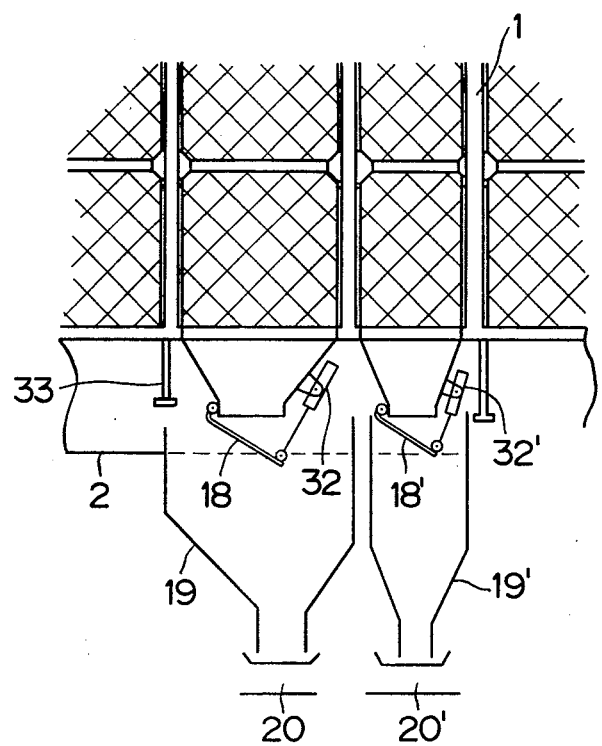
FIG. 4 is a fragmentary side view of adsorbent and packing dischargers according to the invention.

FIG. 4 shows devices for discharging adsorbent and packing. The numerals 32, 32' designate air cylinders for operating the discharge gates 18, 18'. They open the gates 18, 18' above the discharge hoppers 19, 19' to discharge the adsorbent and packing.

Indicated at 33 are reinforcements for the turntable 2.

Turning to FIG. 2, the operation will be explained. The gas to be treated enters the apparatus at the inlet 10, and after regulation in flow by the baffle 10', flows through the packing 26' and the adsorbent 26, and then leaves the apparatus at the outlet 11. The rotary cage 1 revolves at a slow speed in the direction of the arrow. While the cage makes one complete turn, the particulate separating packing and the gas-removal adsorbent in the packing sections remove dust and adsorb sulfur oxides from the dirty gas that passes through the packing section in the adsorption zone a. Next, in the heating zone b, the materials are heated by an inert hot gas from the inlet 22 to a temperature suitable for desorption. In the desorption zone c, the adsorbed sulfur oxides are released from the materials by means of a desorption gas which is a mixture of an inert gas from the inlet 12 and steam. The desorption gas is now rich with sulfur oxides, and is led out of the outlet 13 to a sulfur recovery unit not shown. Of course, the hot gas used for the heating purpose and discharged from the apparatus is also sent to the same unit for sulfur recovery.

Following the desorption, the adsorbent enters the cooling zone d, where it is cooled by an inert gas at a low temperature from the inlet 24 to a temperature about equal to that of the treated gas, and, as the cage goes on turning, it re-enters the adsorption zone a.

While the heating zone b has been explained in the foregoing description in connection with FIGS. 1 and 2, it should be obvious to those skilled in the art that the heating zone b is not essential provided the desorption gas for the desorption zone b is preheated.

As described above, the adsorbent goes through the repeated cycles of adsorption, (heating where necessary), desorption, and cooling, with the revolution of the cage 1, and naturally the adsorbent capacity decreases with the repeated usage. Thus, after 5 to 15 runs, for example, the used adsorbent is taken out of the discharge gate 18 and fresh material is supplied from the supply tank 14 to keep up the adsorbent performance. For that purpose an adsorbent replacement zone e is provided to renew the adsorbent so as to make up for the loss of adsorbent capacity.

Similarly, the particulate separating packing with dust deposited from the exhaust gas is also renewed in the same replacement zone e to a proportion suited for avoiding an increase in the pressure loss through the passage of the gas. The revolution of the rotary cage 1 may be either continuous or intermittent so that each segment defined by the partitions 28 may advance at one time.

As for the adsorbent, there is no need of using a high-grade activated carbon but cheap semi-carbonized coke or the like serves the purpose, because the broad area for passage made available by the apparatus of the invention provides a relatively long passage time. In addition to this economical advantage, the utilization of waste adsorbent as fuel would further reduce the desulfurization cost. The adsorbent is kept stationary with respect to the cage during the operation cycles except for replenishment or replacement, and there is little loss of the adsorbent due to powdering with friction.

The advantages of the apparatus according to the invention so far described may be briefly summarized as follows:

(1) Being a vertical type, it permits a saving of the ground area for its erection.

(2) The operation, in essence, is continuous, with no variation in pressure of the gas being treated, and hence there is no adverse effect upon the combustion equipment.

(3) Against fluctuations in the sulfur oxide gas and dust concentrations the optimum desulfurization conditions can be secured through control of the revolutional speed.

(4) Since the adsorbent has no chance of contacting the air during the cyclic operation, the danger of dust explosion or burning or other accident can be prevented.

(5) The periodic replacement of the packing after use for a given period of time precludes the possibility of choking with dust. There is no trouble even when a dust-laden gas is being handled, and pressure changes with dust are negligible.

(6) The replacement of the adsorbent and packing can be easily mechanized, and unmanned operation is feasible.

(7) Because a large area is provided for gas passage, inexpensive semi-coke or the like may be employed in place of a high-grade adsorbent. Also, the used adsorbent may be utilized as fuel, making further reduction of the desulfurization cost possible.

(8) Such a large volume of water and fuel for reheating as required in the wet process are not needed.

What is claimed is:

1. An exhaust gas desulfurization apparatus comprising:
   a housing having a plurality of gas inlets and outlets;
   a cylindrical cage mounted rotatably about a substantially vertical axis within said housing, said cylindrical cage including a perforated cylindrical outer shell, a concentric perforated inner shell, an imperforate top section, an imperforate bottom section and a concentric perforated shell placed intermediate the inner and outer cylindrical shells and defining, respectively, inner and outer packing sections, said cage further including a plurality of vertically disposed, radially extending sealing partitions defining a plurality of chambers within each of said inner and outer packing sections;
   a gas-removing adsorbent placed stationarily with respect to and within the inner packing section;
   a particulate separating packing placed stationarily with respect to and within the outer packing section, said particulate separating packing having a smaller particle size than said gas removing adsorbent;
   a means for replacing said gas-removing adsorbent;
   a means for replacing said particulate separating packing independent of said gas-removing adsorbent;
   an inner casing secured within said housing between the vertical axis and the concentric inner shell, said inner casing and corresponding sections of said housing being divided into an adsorption zone, a desorption zone, a cooling zone and a gas-removing adsorbent and particulate separating packing replacement zone,
   a first means for sealingly engaging said housing with the perforated cylindrical outer shell; and
   a second means for sealingly engaging said inner casing with the concentric inner shell, said first and second sealing means provided to sealingly separate the inner casing, the corresponding sections of said housing and some of the plurality of chambers into said zones, whereby rotation of said cylindrical cage between each of said zones permits removal of particulate and gaseous contaminants from an exhaust gas introduced into said apparatus through one of said plurality of gas inlets such that the gas passes sequentially through said particulate separating packing contained in the outer packing section and thereafter through the gas-removal adsorbent, desorption of said adsorbent, cooling of said adsorbent and selective replacement of said gas-removal adsorbent and said particulate separating packing.

2. The exhaust gas desulfurization apparatus of claim 1, wherein said particulate separating packing is an inert substance.

3. The exhaust gas desulfurization apparatus of claim 1, wherein said particulate separating packing is the same material as said gas-removing adsorbent.

4. The exhaust gas desulfurization apparatus of claim 1, wherein said inner casing and said housing further includes a heating zone.

5. The exhaust gas desulfurization apparatus of claim 1, wherein said imperforate top section includes gaseous sealing means.

6. The exhaust gas desulfurization apparatus of claim 1, wherein said cylindrical cage is provided with means to prevent transfer of said gas-removing adsorbent and particulate separating packing between said inner and outer packing sections.

7. The exhaust gas desurfurization apparatus of claim 1, wherein means are provided to introduce a sealing gas between said housing and the perforated cylindrical outer shell and between said inner casing and the concentric inner shell.

* * * * *